United States Patent [19]
Houchin et al.

[11] Patent Number: 5,983,229
[45] Date of Patent: Nov. 9, 1999

[54] EXTENSION PERSISTENCE MECHANISM FOR A DIGITAL IMAGE FORMAT

[75] Inventors: J. Scott Houchin, Rochester; Mary E. Couwenhoven, Fairport; Kenneth A. Parulski, Rochester, all of N.Y.

[73] Assignee: Eastman Kodak Company, Rochester, N.Y.

[21] Appl. No.: 08/868,858

[22] Filed: Jun. 5, 1997

[51] Int. Cl.[6] .................................................. G06F 17/30
[52] U.S. Cl. .......................... 707/100; 707/200; 348/384; 370/474; 386/95
[58] Field of Search .................................. 707/200, 100; 348/384; 370/474; 386/95

[56] References Cited

U.S. PATENT DOCUMENTS

| | | | |
|---|---|---|---|
| 4,635,136 | 1/1987 | Ciampa et al. | 386/64 |
| 5,257,097 | 10/1993 | Pineau et al. | 358/500 |
| 5,414,455 | 5/1995 | Hooper et al. | 348/7 |
| 5,493,677 | 2/1996 | Balogh et al. | 707/104 |
| 5,661,823 | 8/1997 | Yamauchi et al. | 382/239 |
| 5,708,826 | 1/1998 | Ikeda et al. | 707/501 |
| 5,737,491 | 4/1998 | Allen et al. | 704/270 |

OTHER PUBLICATIONS

Gulick, Rebecca, "Kodak's Consumer Focus; Alliance to Push FlashPix Format", MacWEEk, vol. 10, No. 22, Jun. 3, 1996, pp. 1–2.

Woodcock et al., Microsoft Computer Dictionary, Microsoft Press, (Redmond, Washington, 1994), pp. 6–7, pp. 336–337, Jan. 1994.

O'Gorman, F, "An Assessment of TIFF (Tag Image File Format) As An Image Interchange Format"<OIS Document Management 92. Proceedings of the Conference, Jan. 1992, London, U.K., pp. 281–284.

*Primary Examiner*—Paul R. Lintz
*Attorney, Agent, or Firm*—Peyton C. Watkins

[57] ABSTRACT

An image file structure that supports and selectively maintains extensions is disclosed incorporating, a header, image data, non-image data and extension portions. Each extension portion includes extension data and an extension persistence value that is selected to indicate if extension data is to be maintained as part of the image file when modifications have been made to the image data portions of the image file or not.

11 Claims, 5 Drawing Sheets

EXTENSION PERSISTENCE MECHANISM FOR A DIGITAL IMAGE FORMAT

FIELD OF THE INVENTION

The invention relates generally to the field of electronic imaging, and in particular to the storage of digital images. More specifically, the invention relates to an extension technique that tells a software application whether extension data should be maintained or deleted if baseline data (image or non-image data) is modified by the application.

BACKGROUND OF THE INVENTION

A number of existing image formats include a method for extending the capabilities of the format (from hereafter known as an extension). For example, TIFF (Tag Image File Format) allows new tags to be added to store new data (such as a digitized audio recording) inside a TIFF image file. This can be accomplished by requesting a new TIFF tag number from Adobe Corporation, the developer of TIFF. Existing TIFF applications are able to open and view images containing such extension tags because the TIFF standard instructs applications to ignore any tag numbers they are not familiar with. In this case, the application would allow the image to be viewed, but would not play back the audio information. Unfortunately, if the image file is modified in any way by the application, for example, by cropping, or adjusting the color or brightness of the image, or by adding copyright information to the non-image data contained in the image, the extension data (such as an audio clip) is deleted when the modified file is saved by the TIFF application. The TIFF specification requires that unfamiliar tags be deleted, since the application does not know whether this new tag contains data that is still valid (such as an audio clip), or data which is no longer valid (such as a histogram of the number of pixels at each code value in the image).

What is needed is a mechanism for the particular extension to tell the application whether the ancillary data, which belongs to the extension, should be maintained if the baseline data in the image file is altered. In the newly developed FlashPix image format, a mechanism is specified, that enables an application to determine the validity of ancillary data in the file which belongs to a particular extension (for example, an audio extension which may contain an audio stream and other related data). This mechanism is not available in other image formats. Applications writing other formats could choose to always maintain all extension data; however, this data might be needlessly transported with the image whenever the image is copied, either from one file to another on a system or across a network. This results in wasted disk space and may decrease network performance. It may also result in the end applications using invalid extension data. The application can also choose to delete all ancillary data; however, this data may have provided important functionality which was not invalidated. The result is an image that may be much less useful than originally intended.

SUMMARY OF THE INVENTION

The present invention is directed to overcoming one or more of the problems set forth above. Briefly summarized, the present invention is a means and method for identifying the validity of an extension, so that the ancillary data for a particular extension is maintained in the file if the extension is valid, and is removed from the file if the extension is invalid. Specifically, there is provided, an image file structure that supports and selectively maintains extensions, comprising:

a header, image data, non-image data and extensions portions; and said extensions portions including extension data and an extension persistence value selected to indicate if extension data is to be maintained as part of the image file when modifications have been made to the image data portions of the image file.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention provides a flexible image format (e.g. FlashPix), the ability to manage extension data (additional image, audio, or non-image data) that is added to the core image format data by using an extension persistence property. This allows the extension to tell an application (which has no knowledge of the details of extension data) whether the extension data should be maintained or deleted if the core image format data is modified by the application.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
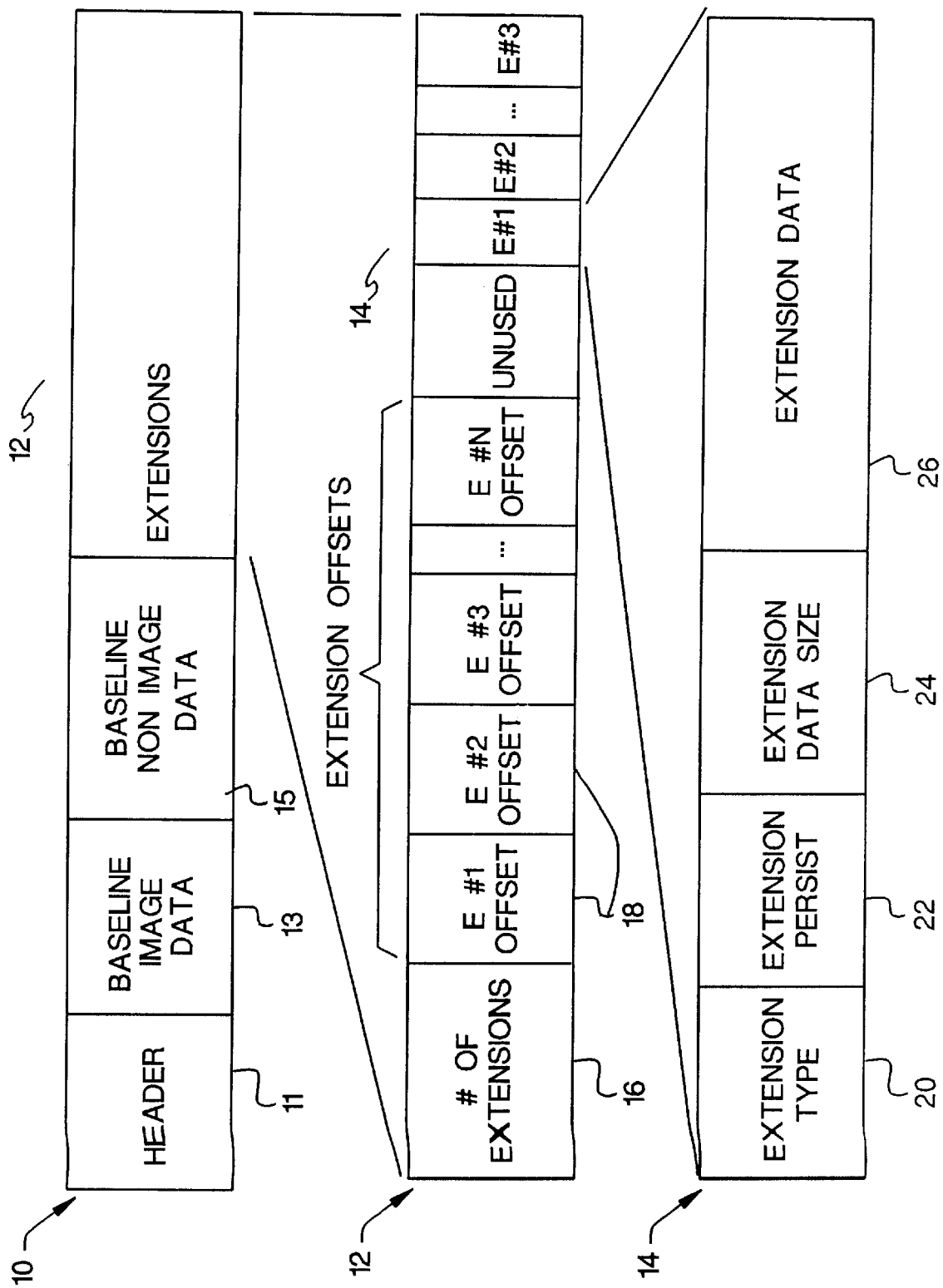
FIG. 1 depicts the structure of a hypothetical image file that contains extensions.

Referring to FIG. 1, the file structure of a hypothetical image file 10 that contains extensions 12 with extension properties 14 is shown. In this embodiment, the elements of the file include a file header 11, baseline image data 13, baseline non-image data 15, followed by the extensions 12. The extensions 12 contains a field 16 for indicating the total number of extensions and fields 18 that record the location or offset of each extension, and then for each extension 14 there is a field for extension type 20, extension persistence property 22, extension data size 24, and the extension data 26.

The extension persistence property 22 indicates the validity of the extension data 26 as a function of whether or not the core elements of the file are modified. The values for the extension persistence property 22 are listed in Table 1. The values listed in Table 1 are Hex.

TABLE 1.

The meaning of The Extension Persistence Property 22

| Value | Meaning |
|---|---|
| 0 × 0 | Extension is valid and remains in the file independent of modifications to the core elements of the file. |
| 0 × 1 | Extension is invalid upon any modification to the core elements of the file, and must be removed from the file when core elements are edited. |
| 0 × 2 | Extension is potentially invalid upon modification to the core elements of the file, and must remain in the file until an application that understands the extension can determine if the extension is valid (remains in the file) or invalid (removed from the file). |

The persistence property 22 is set based upon the requirements for the extension. For example, an application desires to store audio annotations with the image. The audio extension might have a persistence value of 0×0, which means that the audio annotation is always saved with the image independent of any core element modifications. Another application might store a histogram of the image in addition to the core image data. This type of extension might have a persistence value of 0×1, which means that if an application edits the file, the histogram extension is no longer valid and must be deleted upon saving the file. The histogram extension might be assigned a value of 0×2 (potentially invalid) instead of 0×1 In this case, an application that doesn't understand the histogram extension must maintain the extension in the file independent of core element edits. On the other hand, an application that does understand the histogram extension is required to determine the validity of the data prior to using it. If the extension data is invalid it must be removed from the file.

Figure 2:
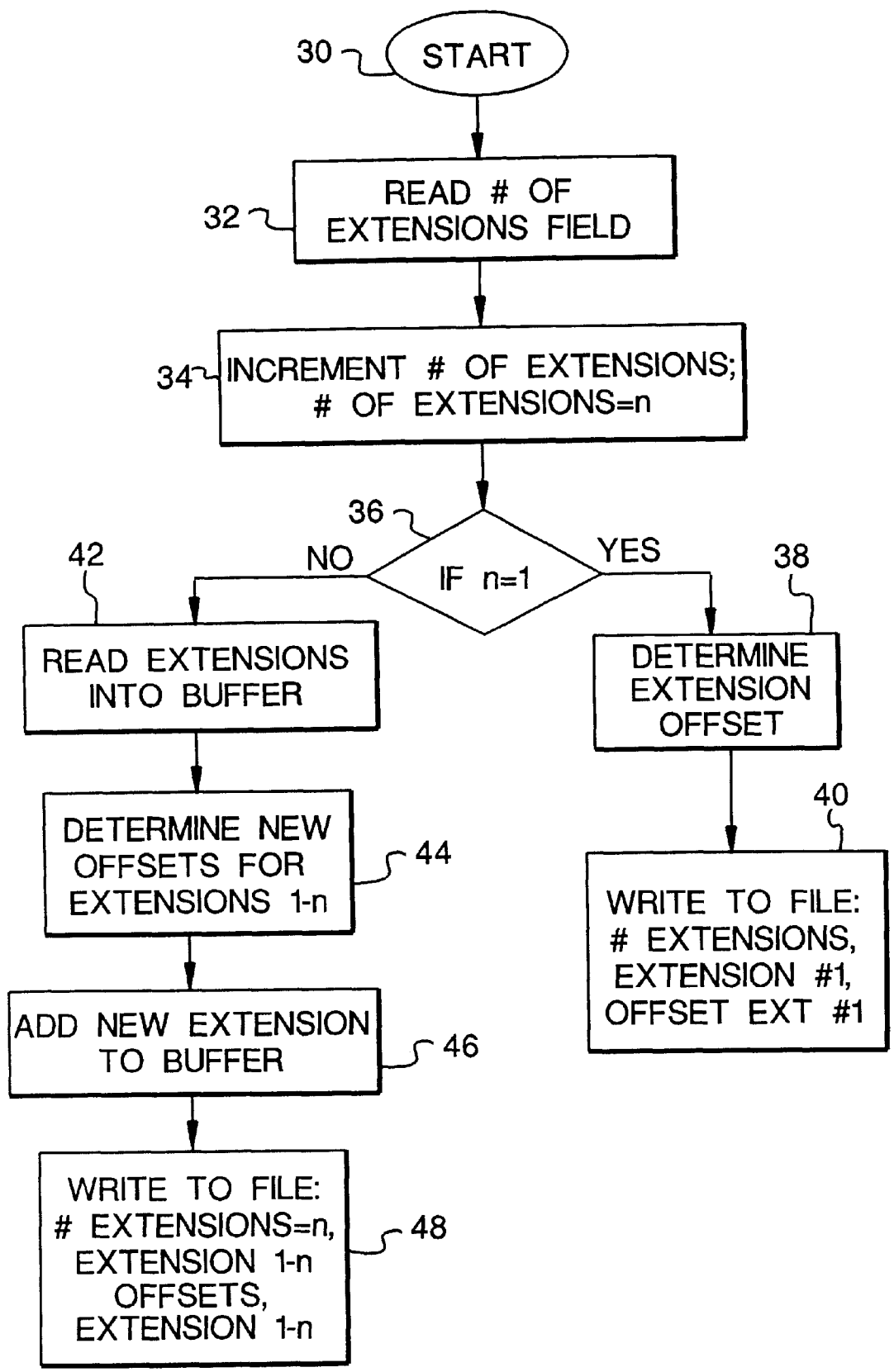
FIG. 2 depicts the steps an application must take to add extension data to the hypothetical image file.

FIG. 2 depicts the steps an application must take to add extension data to the hypothetical image file. The application starts at 30 and steps to reading the number of extensions field 16 from the image file 10 at step 32 and increments this value at step 34. If per decision block 36 the incremented value is 1, the extension about to be added is the first extension to be added to the image file 10. The application must determine the location in the file where the extension data will be written (the extension #1 offset) per step 38 and then write the incremented number of extensions, the extension #1 offset and the extension #1 data to the file per step 40. If the incremented value of the number of extensions field is not one, then there are already extensions in this file. The application can read the extension data 26 for the extensions already in the file into a buffer in memory per step 42. The application can then determine the new offsets for both the existing extensions and the new extensions, taking into account the space required to store the extension offset for the new extension per step 44. The new extension data is then added to the buffer in memory per step 46. Finally, the incremented value of the number of extensions field, the buffer of extension data and the extensions offsets are written to the file per step 48.

Figure 3:
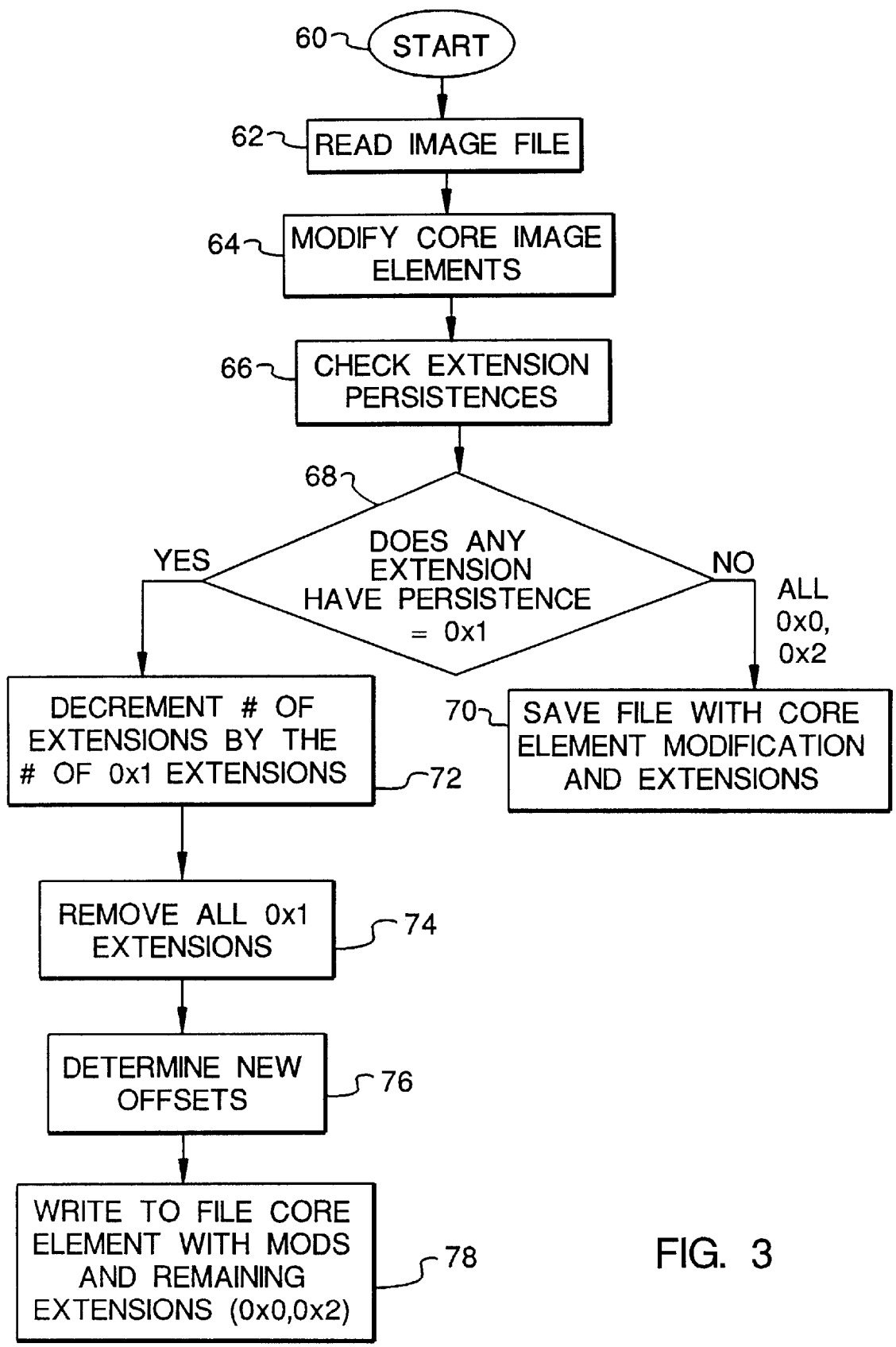
FIG. 3 depicts the steps an application takes when reading, modifying and saving extended files.

Referring to FIG. 3 which depicts the steps an application takes when reading the image file, modifying the core elements of the file, and checking the persistence of the extensions in the file. The application, starts at step 60 and in the course of operation, reads the image file per step 62. At some point the application may modify one or more core elements in the file (either image data or non-image data) per step 64. At that point, the application must determine if any of the extensions in the file have been rendered invalid and thus must be deleted. The application reads the extension data for each extension, noting the value of the extension persistence field in particular for each extension per step 66. For each extension in the file, if the persistence field is 0×01 per step 68, the application must delete that extension. The application can do this by reading all of the extension data that is still valid into memory. The application can then determine the new offsets for each extension that is still valid, taking into account the deleted extension data per steps 72, 74, and 76. The application then writes the updated extension offsets and the buffer of extension data back to the file per step 78. The application also decrements the number of extensions field by the number of deleted extensions and writes that new value back to the file. If the persistence field 0×1 is not present the file is saved per step 70.

Figure 4:
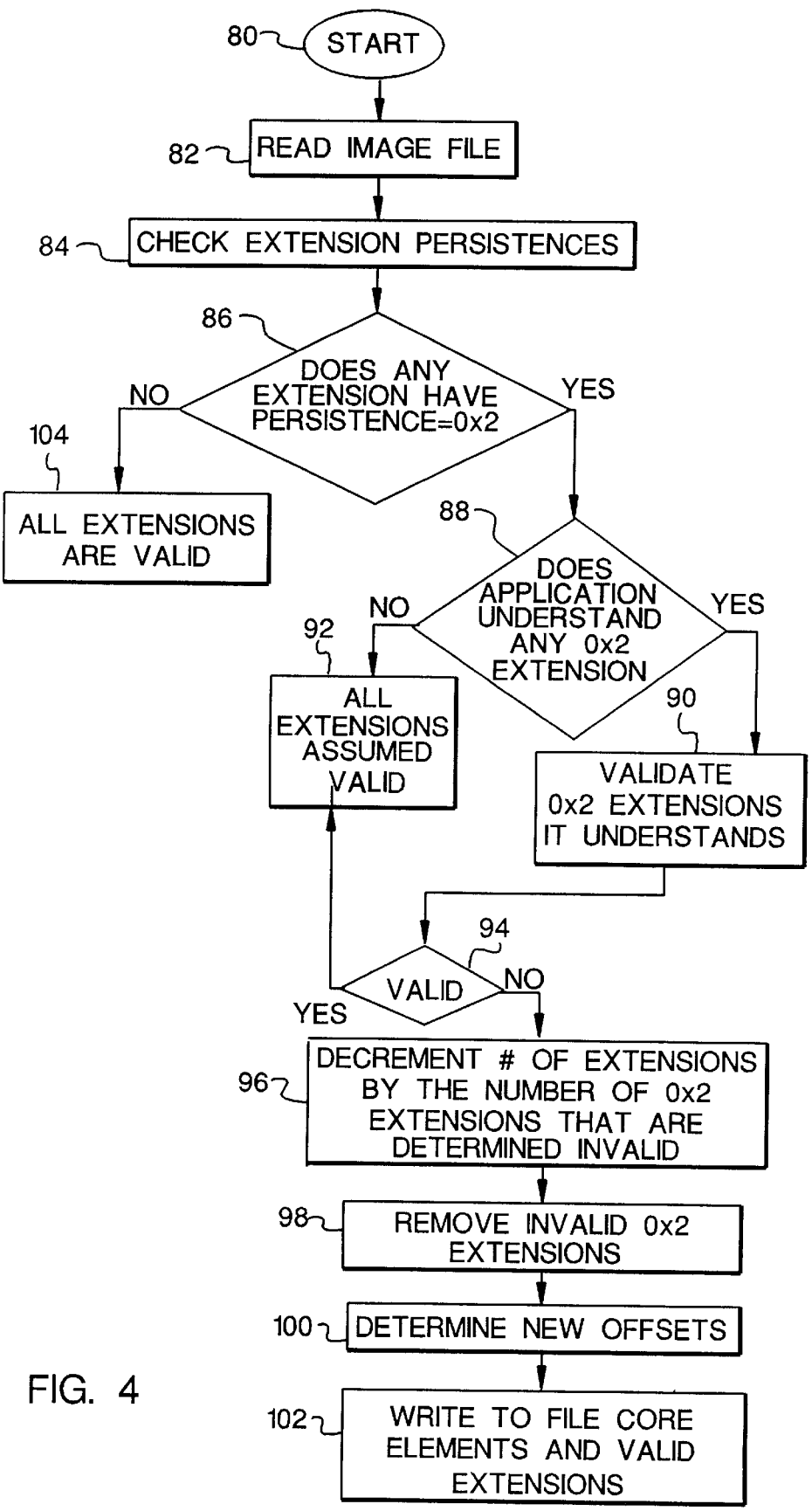
FIG. 4 depicts the steps an application must take to validate the extension data in the hypothetical image file.

FIG. 4 depicts the steps an application takes when validating extension data in the file. The application starts step 80 by reading the image file step 82. In particular, the application must read the extension persistence field from the data for each extension per step 84. If no extension has a persistence equal to 0×2, all extensions are valid per block 104. For each extension that has a persistence value of 0×2, the application must determine if it understands that extension per steps 86 and 88, which can be accomplished by determining if the value in the extension type field for that extension is a known value. If the application does not understand that extension, it must assume that the extension is still valid per step 92 and leave the data for that extension untouched. If the application does understand that extension, it must determine if the data for that extension is still valid per steps 90 and 94. The method to perform this test will be determined by the definition of each particular extension. If the application determines that the extension is not valid per step 96, it must delete that extension per step 98. For each invalid extension, the application must decrement the number of extensions field by one and then write the final value back to the file. The application can then read all of the extension data into a buffer in memory while removing the data for the invalid extensions. The application can then update the values of the extension offsets, taking into account the deleted extensions. Once the new offsets have been determined per step 100 the application can then write the new extension offsets and the buffer of extension data back to the file per step 102.

Figure 5:
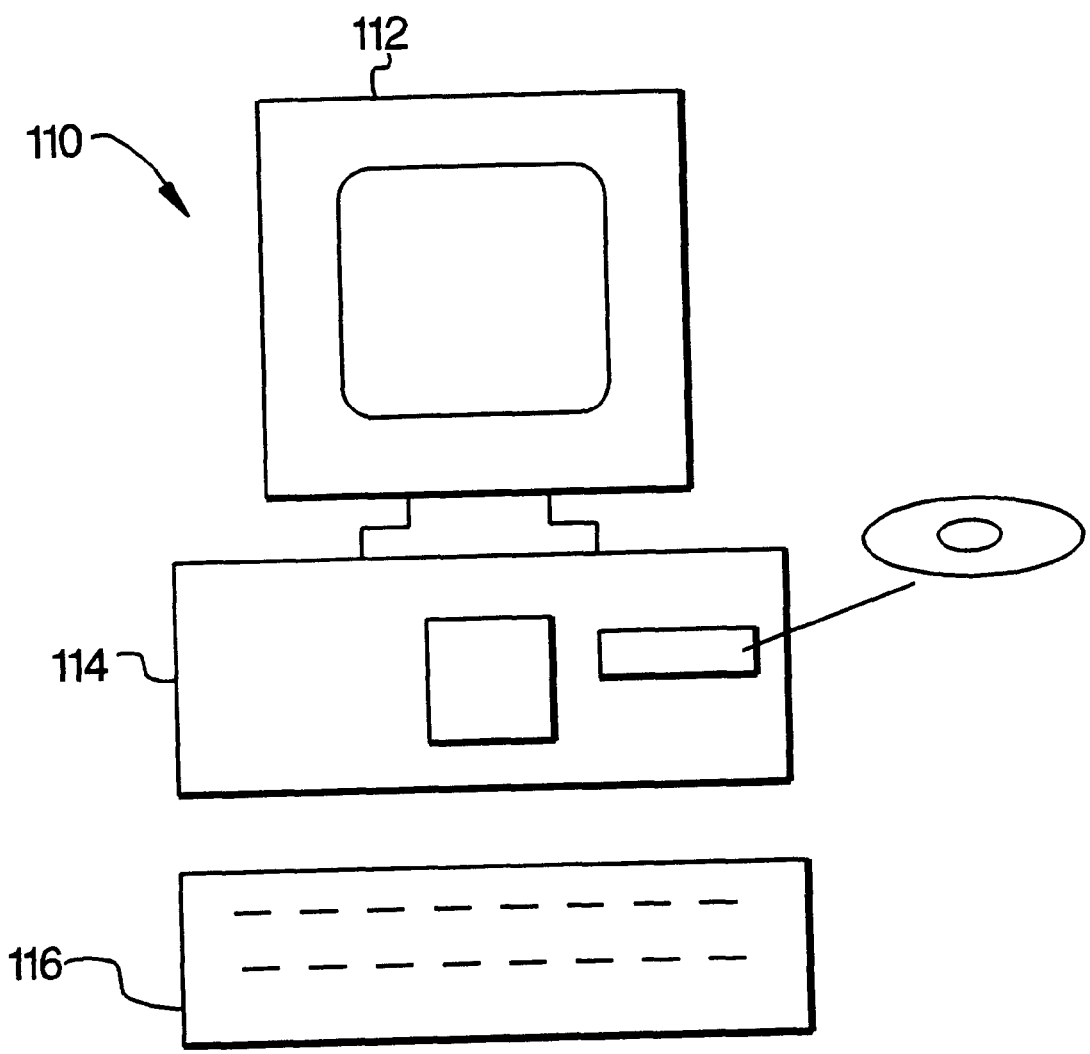
FIG. 5 illustrates a computer upon which the file structure of the present invention is implemented.

FIG. 5 illustrates a computer 110 of the PC type wherein the present invention is practiced. The computer 110 includes a display 112, central processor 114, and a keyboard 116 for data entry. Accessories such as a mouse, supplementary memory, (not shown) may be added to facilitate image and data processing. The image file structure may be contained in the software, loaded in the computer, or on transportable storage media such as a floppy disk, tape, or write/erasable CD. Other variants of the hardware for executing the image file structure are well within the skills of practitioners in this art.

The invention has been described with reference to a preferred embodiment; However, it will be appreciated that variations and modifications can be effected by a person of ordinary skill in the art without departing from the scope of the invention.

PARTS LIST 10 image file
11 file header
12 extensions
13 baseline image data 14 extension properties
15 baseline non-image data
16 number of extensions field
18 recording fields
20 extension type field
22 extension persistence property
24 extension data size
26 extension data
30 start step
32 read number of extensions
34 increments number of extensions
36 decision block
38 determine extension offset
40 write to file
42 read extensions into buffer/memory
44 determine new offsets for extension, 1−n
46 add new extensions to buffer/memory
48 write to file
60 start step
62 read image file
64 modify core image elements
66 check extensions persistence
68 decision block
70 save file
72 decrement number of extensions by the number of 0×1 extensions
74 remove all 0×1 extensions
76 determine new offsets
78 write to file
80 start step
82 read image file
84 check extensions persistence
86 decision block
88 decision block
90 validate extensions
92 extensions assumed valid
94 valid
96 decrement number of extensions
98 delete extension
100 determine new offsets
102 write to file
104 all extensions are valid
110 computer
112 display
114 central processor
116 keyboard

What is claimed is:

1. A method for creating an image file that supports and selectively maintains extensions, comprising the step of:

providing a header, image data, non-image data and a plurality of extension portions; and said extension portions including extension data having a size and an extension persistence value selected to indicate if extension data is to be maintained as part of the image file when modifications have been made to the image data portions of the image file.

2. The method for creating the image file according to claim 1 and further comprising the additional step of:

providing a plurality of extensions each having an extension persistence value selected to indicate if associated extension data is to be maintained as part of the image file when modifications have been made to the image data.

3. The method for creating the image file according to claim 1 wherein the extension data is audio data.

4. The method for creating the image file according to claim 1 wherein for said extension portions an additional step comprises including an offset address for each extension.

5. The method for creating the image file according to claim 1 wherein for each said extension portion another additional step comprises including a size of the extension data.

6. A computer system for executing an image file that supports and selectively maintains extensions, comprising:

means for reading and executing a header, image data, non-image data and extension portions of the image file wherein said extension portions including extension data and an extension persistence value selected to indicate if extension data is to be maintained as part of the image file when modifications have been made to the image data portions of the image file.

7. A storage media having stored thereon an image file comprising:

a header;

image data;

extension data; and an extension persistence property having one state for disassociating said extension data from said image data when said image data is modified, and a second state for maintaining said extension data with said image data independent of modifications to said image data.

8. The storage media according to claim 7 and further comprising:

a plurality of extensions each having an extension persistence property selected to indicate if associated extension data is to be maintained as part of the image file when modifications have been made to the image data.

9. The storage media according to claim 7 wherein the stored extension data is audio data.

10. The storage media according to claim 8 wherein said plurality of extensions also include stored offset address for each extension.

11. The storage media according to claim 8 wherein said plurality of extensions also includes a size for said extension data.

* * * * *